United States Patent [19]

Auvity

[11] Patent Number: 5,797,585
[45] Date of Patent: Aug. 25, 1998

[54] CONTROL DEVICE FOR A PIVOTING VALVE FLAP FOR A HEATING AND/OR AIR CONDITIONING INSTALLATION IN A MOTOR VEHICLE

[75] Inventor: Michel Auvity, Velizy, France

[73] Assignee: Valeo Climatisation, La Verriere, France

[21] Appl. No.: 768,311

[22] Filed: Dec. 17, 1996

[30] Foreign Application Priority Data

Dec. 19, 1995 [FR] France ............... 95 15076

[51] Int. Cl.⁶ ............... F16K 31/44; F16K 31/53
[52] U.S. Cl. ............... 251/80; 251/229; 251/248; 251/249.5; 251/279; 251/305; 454/69
[58] Field of Search ............... 251/77, 80, 228, 251/229, 248, 249.5, 250.5, 298, 305, 279; 454/69, 143

[56] References Cited

U.S. PATENT DOCUMENTS

| | | | |
|---|---|---|---|
| 1,998,886 | 4/1935 | Scheid | 251/305 |
| 2,431,659 | 11/1947 | Flounders | 251/80 |
| 2,942,620 | 6/1960 | Medearis | 137/590 |
| 3,212,350 | 10/1965 | Bradford | 251/80 |
| 3,520,332 | 7/1970 | Willard | 137/624.13 |
| 3,929,314 | 12/1975 | Stratynski | 251/305 |
| 4,073,465 | 2/1978 | Sheppard | 251/80 |
| 4,200,258 | 4/1980 | Gliatas | 251/305 |
| 4,913,398 | 4/1990 | Ziaylek, Jr. et al. | 251/87 |
| 5,255,891 | 10/1993 | Pearson et al. | 251/249.5 |
| 5,354,234 | 10/1994 | Arold et al. | 251/279 |

FOREIGN PATENT DOCUMENTS

| 815 938 | 4/1951 | Germany . |
|---|---|---|
| 1 908 580 | 2/1969 | Germany . |

OTHER PUBLICATIONS

French Search Report dated 13 Sep. 1996.

*Primary Examiner*—George L. Walton
*Attorney, Agent, or Firm*—Morgan & Finnegan, L.L.P.

[57] ABSTRACT

A flap valve for a heating and/or air conditioning installation for a motor vehicle has a valve flap which is operated by a control device between an open position and a closed position. The control device comprises a driving lever which is coupled, through a link, to a driven lever fixed to the valve flap. The driving lever is rotated about its axis between an open position and a closed position of the driving lever, during which it passes through an intermediate position near to the closed position. The valve flap is closed when the driving lever reaches its intermediate position, so that the travel of the latter between its intermediate and closed positions is dead travel during which the valve is in the closed position of the valve and the link is in compression so as to change its effective length.

5 Claims, 1 Drawing Sheet

CONTROL DEVICE FOR A PIVOTING VALVE FLAP FOR A HEATING AND/OR AIR CONDITIONING INSTALLATION IN A MOTOR VEHICLE

FIELD OF THE INVENTION

This invention relates to flap valves, especially for use in heating and/or air conditioning installations for the cabin of a motor vehicle; in particular, the invention relates to a control device for the flap of such a valve.

BACKGROUND OF THE INVENTION

Control devices of the above type are known which comprise a driving lever coupled through a link to a driven lever fixed to the valve flap. The driving lever is arranged to rotate in pivoting movement between two positions of the driving lever which consist of an open position and a closed position, the valve being in its open and closed positions respectively in those positions of the driving lever. In this way the driving lever, which is actuated either by a suitable manual control or by a motorised control, governs the pivoting movement of the valve flap so as to put the latter into selected positions, whereby to control the flow of an air stream into a duct which forms part of the installation.

However, due to the fact that the components of the control device, and in particular the driving lever, the driven lever and the link, are made by mass production methods with quite wide manufacturing tolerances, it can happen that, when the driving lever is in its closed position, the valve is not in fact fully closed, that is to say it is not in full engagement on its valve seat. This then results in a leakage of air which can be detrimental to proper operation of the installation.

DISCUSSION OF THE INVENTION

A main object of the invention is to overcome the above drawback.

According to the invention, a control device for a pivoting valve flap, for a heating and/or air conditioning installation for a motor vehicle, the control device comprising a driving lever which is coupled through a link to a driven lever fixed to the valve flap, the driving lever being arranged to be rotated in pivoting movement from one of two positions to the other, the said positions comprising an open position in which the valve flap is open, and a closed position in which the valve flap is closed, is characterised in that the driving lever is arranged to pass through an intermediate position, near to the closed position, the valve flap being closed when the driving lever is in a said intermediate position, so that the displacement of the driving lever from its intermediate position to its closed position, or vice versa, constitutes dead travel, during which the valve flap is closed and the link is in compression.

Thus, when the driving lever is displaced from its open position and reaches its intermediate position, the valve is already closed and prevents any further passage of the airstream into the duct. During further displacement of the driving lever from its intermediate position to its closed position, i.e. during its course of dead travel, the valve remains closed, that is to say the valve flap is held in sealing engagement on its valve seat, while the link is in compression. Similarly, when the driving lever is subsequently displaced from its closed position towards its opening position, the valve remains closed until the intermediate position is reached, after which the valve starts to open.

The intermediate position, which is located near to the closed position of the driving lever, will differ from one control device to another according to the geometry of the device, i.e. according to the particular dimensions of the components of the device, that is to say, essentially the value of the pitch, or straight line distance, between the driving lever and the driven lever, and the respective dimensions of the driving lever, the driven lever and the link.

According to a preferred feature of the invention, the displacement of the driving lever between the open position and the closed position, or vice versa, corresponds to an angular displacement of less than 90 degrees.

Preferably, the displacement of the driving lever between its intermediate position and its closed position, or vice versa, corresponds to an angular displacement of less than 10 degrees.

In preferred embodiments of the invention, the driving lever is arranged to assume two open positions which are situated symmetrically on either side of its closed position, the said closed position being unstable. In that case, the driving lever is preferably arranged to pass through two intermediate positions which are situated symmetrically on either side of its closed position, so that the displacement of the driving lever between its two intermediate positions constitutes dead travel in which the valve flap is closed and the link is in compression.

In preferred embodiments of the invention, the link is coupled through two articulations to the driving lever and to the driven lever respectively, the link being deformable, in particular by bending, in such a way that the distance between the two articulations is able to vary during the displacement of the driving lever which corresponds to the dead travel.

Further features and advantages of the invention will appear more clearly on a reading of the following detailed description of a preferred embodiment of the invention, which is given by way of non-limiting example only and with reference to the accompanying drawings.

DESCRIPTION OF A PREFERRED EMBODIMENT OF THE INVENTION

Figure 1:
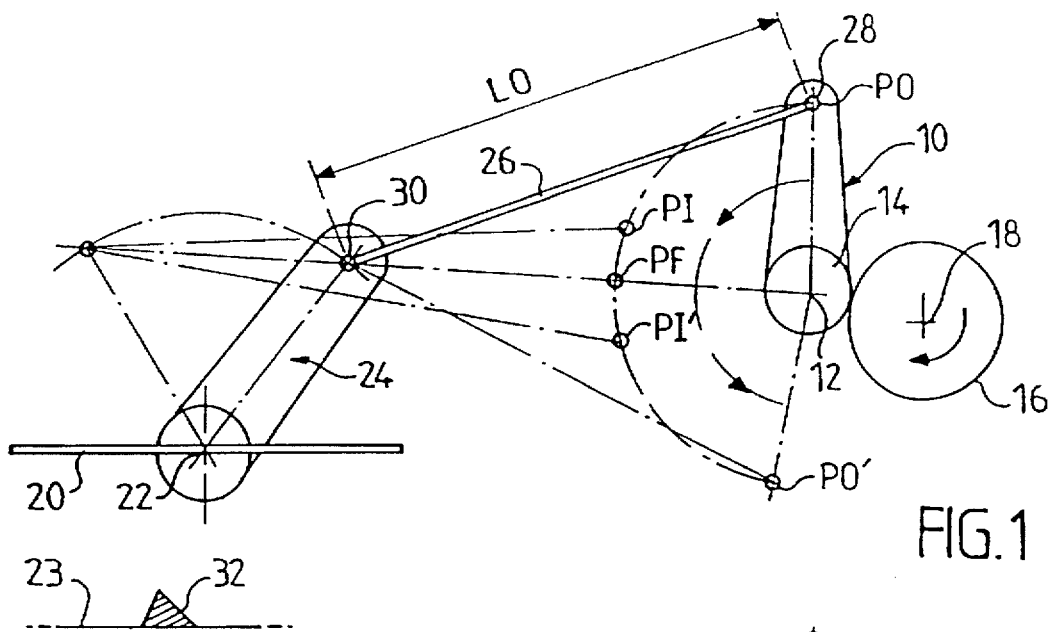
FIG. 1 is a diagrammatic side view of a control device in accordance with the invention, in which the driving lever is in an open position.

The control device shown in FIG. 1 comprises a driving lever 10 which is mounted for pivoting movement about an axis of rotation 12. The driving lever 10 is fixed to a toothed wheel 14 which is arranged to be actuated by a first toothed wheel 16. The toothed wheel 16 is mounted for rotation about an axis 18 which is parallel to the axis 12. The wheel 16 may be driven in rotation by manual control, or by a motorised control means, so as to cause the driving lever 10 to be displaced in rotation about the axis 12.

Figure 2:
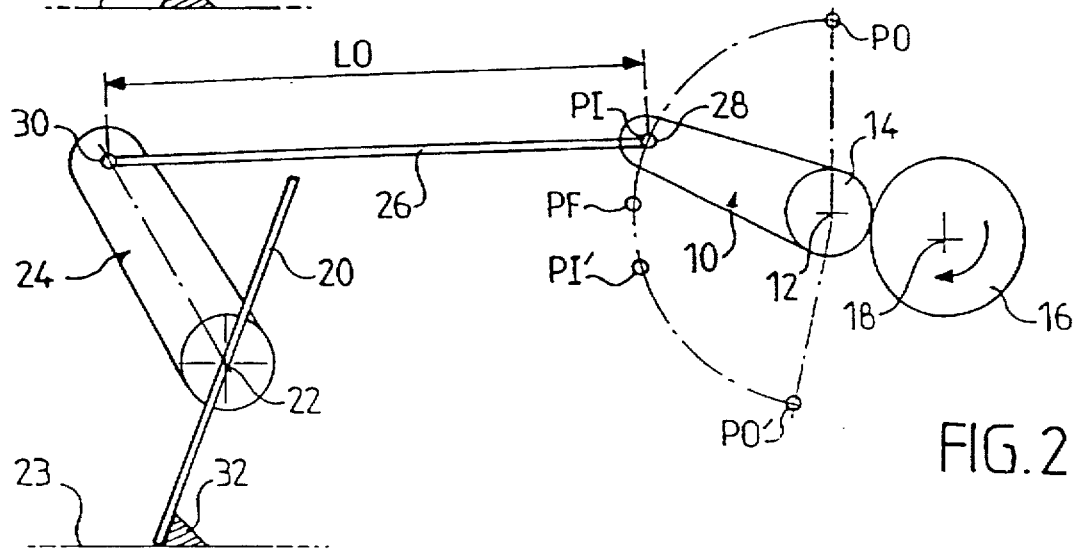
FIG. 2 is a view similar to that in FIG. 1, in which the driving lever is in an intermediate position.
Figure 3:
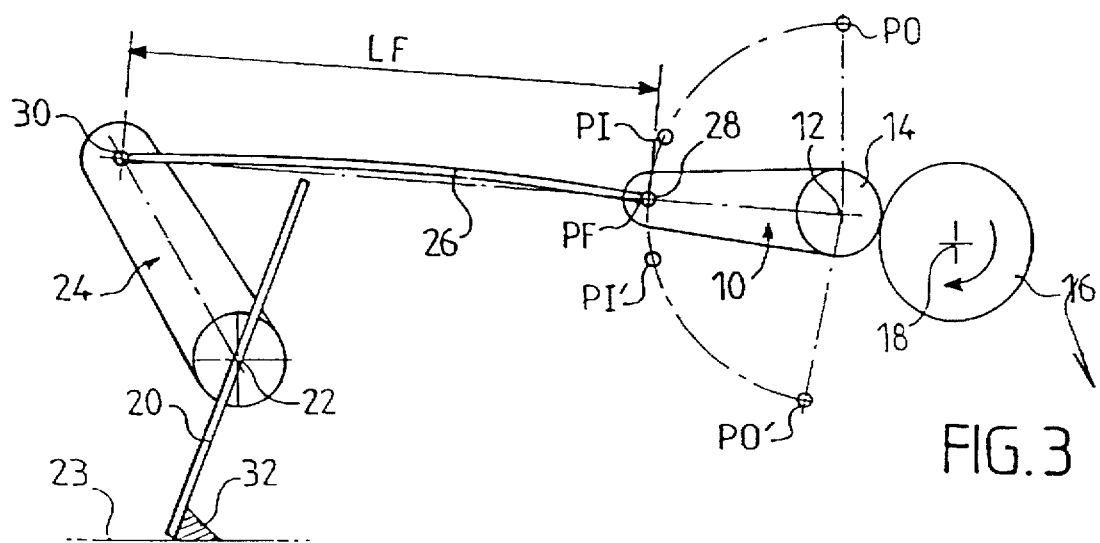
FIG. 3 is a view similar to that in FIG. 1, in which the driving lever is in a closed position.

The driving lever 10 is displaced from a first open position PO towards a closed position PF, and then towards a second open position PO', and vice versa (see FIG. 1). The driving lever 10 is shown in the positions PO, PI and PF respectively in FIGS. 1, 2 and 3, the position PI being an intermediate position between the positions PO and PF. The two open positions PO and PO' are symmetrical on either side of the closed position PF, which is an unstable position. The angular displacement of the lever 10 from the open position PO or PO' to the closed position PF is less than 90 degrees, and is in this example about 80 degrees. The maximum angular displacement of the lever 10 is therefore less than 180 degrees.

The driving lever 10 controls the pivoting movement of a valve flap 20 which is mounted for pivoting movement about an axis 22 parallel to the axes 12 and 18. The valve flap 20 is the valve member of an air valve arranged to control the flow of air into a duct 23, which is formed in a casing of an installation for heating and/or air conditioning a motor vehicle.

A driven lever 24 is carried on the axis 22; the driven lever 24 is coupled to the driving lever 10 through a link 26. The link 26 is coupled to the driving lever 10 by means of an articulation 28 at the free end of the lever 10, and to the driven lever 24 by means of an articulation 30 at the free end of the lever 24.

The link 26 is deformable, in this example by bending, so that its effective or straight-line length, as defined between the two articulations 28 and 30, is able to vary. In its rest or relaxed position the link 26 has a length LO (FIG. 1), which corresponds to the maximum value of its effective length.

When the driving lever 10 is in the closed position PF, the valve flap 20 is in its closed position, that is to say it makes sealing engagement against an end stop element 32 (FIG. 3) of the valve. The end stop element 32 constitutes a valve seat, such that the flap 20 thus prevents any ingress of air into the duct 23.

Because the components of the control device are manufactured by mass production methods, and with quite wide manufacturing tolerances (as already mentioned), the value of the pitch between the axes 12 and 22, and the value of the respective lengths of the lever arms defined by the two levers 10 and 24, and the actual length of the link 26, are all liable to vary. If the link 26 were not deformable, it could happen that, in some control devices, the valve flap 20 would not be in full sealing engagement against the end stop element 32 when the driving lever 10 is in its closed position PF.

In order to avoid this situation, the dimensions of the components of the control device are so chosen that, when the driving lever 10 reaches the intermediate position PI (FIGS. 1 and 2), quite near to the closed position PF, the valve flap 20 reaches the fully closed position of the valve. In the embodiment shown, there are two intermediate positions PI and PI', which are symmetrical with each other on either side of the closed position PF. The angular displacement of the driving lever 10 between the positions PI and PF, and that between the positions PI' and PF, is less than 10 degrees in each case.

When the driving lever 10 is displaced from the position PO to the intermediate position PI, the link 26 retains its initial length LO. When the driving lever 10 reaches the intermediate position PI, the valve flap 20 comes into engagement against the end stop element 32. The driving lever 10 is then displaced from the intermediate position PI to the closed position PF, while the flap 20 still remains in engagement against its seat. This causes the link 26 to be subjected to a compressive stress, which causes it to bend so that in the closed position PF of the driving lever 10 (FIG. 3), the length LF between the two articulations 28 and 30, i.e. the effective length of the link 26, is now shorter than the relaxed length LO of the link. It should be noted that in FIG. 3, the degree of bending in the link 26 is exaggerated in the interests of clarity.

The displacement of the driving lever 10 from the position PI to the position PF or vice versa constitutes a course of dead travel, during which the valve flap 20 remains closed and the link 26 is in compression. The same applies to the angular displacement of the driving lever 10 from the closed position PF to the other intermediate position PI', or vice versa. Thus, when the lever 10 passes from one open position PO to the other open position PO', its course of travel includes two phases of dead travel, continuous with each other.

The invention is of course not limited to the embodiment described above by way of example, and it does embrace other versions. Thus, for example, it is possible to provide a single open position of the driving lever and therefore a single intermediate position, the angular displacement of the driving lever then being between the positions PO and PF.

It is also possible to arrange that the link is able to deform in other ways than by bending, from the instant at which its effective length between its two articulations diminishes when it is in compression.

The control device according to the invention is thus able to control the flow of an air stream into a casing which forms part of a heating and/or air conditioning installation. It enables the dimensional variations inherent in mass production of the components of the control device to be compensated for, in such a way that the valve is fully guaranteed to be properly closed when the driving lever is in its closed position.

What is claimed is:

1. A flap valve comprising a valve flap mounted for pivoting movement between an open position and a closed position thereof, and a control device coupled to the flap for actuating the flap in displacement the open and closed positions, the control device comprising: a driving lever having a first end defining a pivot axis and a second end; a driven lever having a first end fixed to the valve flap and a second end; a link coupling the second end of the driving lever to the second end of the driven lever; and actuating means for rotating the driving lever through a course of angular displacement between an open position of the driving lever and a closed position of the driving lever, the valve flap being so oriented that the valve is open and closed when the driving lever is in the open and closed positions, respectively, of the driving lever, wherein the geometry of the control device is such that, when the driving lever is rotated from its open position towards its closed position, the valve flap reaches the closed position of the valve when the driving lever reaches an intermediate position just short of the closed position of the driving lever, whereby to define, between said intermediate and closed positions of the driving lever, a course of dead travel of the driving lever during which the valve is in its closed position, the link being adapted to bend under compression and being subjected to compression over the course of dead travel.

2. The control device according to claim 1, wherein the angular displacement of the driving lever between its said open and closed positions is less than 90 degrees.

3. The control device according to claim 1, wherein the angular displacement of the driving lever between its intermediate and closed positions is less than 10 degrees.

4. The control device according to claim 1, wherein the control device defines two open positions of the driving lever situated symmetrically on either side of the closed position of the driving lever, the closed position of the driving lever being an unstable position.

5. The control device according to claim 4, wherein the control device defines two intermediate positions situated symmetrically on either side of the closed position of the driving lever, whereby the course of dead travel is defined by the two intermediate positions.

* * * * *